(12) United States Patent
Chen et al.

(10) Patent No.: US 8,691,475 B2
(45) Date of Patent: Apr. 8, 2014

(54) METHOD FOR FORMING FUEL CELL FLUID FLOW FIELD PLATE

(71) Applicant: Industrial Technology Research Institute, Hsinchu (TW)

(72) Inventors: Chi-Chang Chen, Changhua County (TW); Huan-Ruei Shiu, Penghu County (TW); Shiqah-Ping Jung, Taoyuan County (TW); Fanghei Tsau, Kaohsiung (TW); Wen-Chen Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/934,193

(22) Filed: Jul. 2, 2013

(65) Prior Publication Data

US 2013/0295493 A1  Nov. 7, 2013

Related U.S. Application Data

(62) Division of application No. 12/764,858, filed on Apr. 21, 2010.

(30) Foreign Application Priority Data

Dec. 24, 2009 (TW) ............................. 98144679 A

(51) Int. Cl.
*H01M 8/00* (2006.01)
*H01M 8/02* (2006.01)

(52) U.S. Cl.
USPC ......................................... 429/535; 429/514

(58) Field of Classification Search
USPC .................................................. 429/535, 514
See application file for complete search history.

(56) References Cited

U.S. PATENT DOCUMENTS 5,464,700 A   11/1995   Steck et al.
(Continued)

FOREIGN PATENT DOCUMENTS

| CN | 1271467 | 10/2000 |
| CN | 1906000 | 1/2007 |

(Continued)

OTHER PUBLICATIONS

China Patent Office, Office Action, Patent Application Serial No. 201010003186.8, Aug. 14, 2012, China.

(Continued)

*Primary Examiner* — Kenneth Douyette

(57) ABSTRACT

According to embodiments of the invention, a fuel cell fluid flow field plate is provided. The fuel cell fluid flow field plate includes a flexible substrate including a fluid distribution zone having at least one flow channel, a manifold penetrating the flexible substrate and next to the fluid distribution zone, an upward extending portion extending upward at a position near an interface between the manifold and the fluid distribution zone, wherein a bend angle is between the upward extending portion and the fluid distribution zone, and the upward extending portion has at least one through-hole penetrating through the flexible substrate to expose the manifold, and a cover extending portion linking with the upward extending portion and covering a portion of the fluid distribution zone.

9 Claims, 9 Drawing Sheets

(56) References Cited

U.S. PATENT DOCUMENTS

| | | | |
|---|---|---|---|
| 5,514,487 | A | 5/1996 | Washington et al. |
| 5,750,281 | A | 5/1998 | Washington et al. |
| 6,017,648 | A | 1/2000 | Jones |
| 6,232,008 | B1 | 5/2001 | Wozniczka et al. |
| 6,274,262 | B1 | 8/2001 | Canfield |
| 6,410,179 | B1 | 6/2002 | Boyer et al. |
| 6,490,778 | B1 * | 12/2002 | Funatsu et al. ............... 29/557 |
| 6,492,055 | B1 | 12/2002 | Shimotori et al. |
| 6,500,580 | B1 | 12/2002 | Marvin et al. |
| 6,607,858 | B2 | 8/2003 | Wozniczka et al. |
| 6,610,435 | B1 | 8/2003 | Maruyama et al. |
| 6,670,068 | B1 * | 12/2003 | Diez ............................ 429/457 |
| 2003/0017377 | A1 * | 1/2003 | Diez ............................ 429/34 |
| 2004/0131914 | A1 * | 7/2004 | Bartholomeyzik et al. ..... 429/34 |
| 2004/0151975 | A1 * | 8/2004 | Allen ........................... 429/38 |
| 2006/0127735 | A1 | 6/2006 | Sabin et al. |
| 2007/0054188 | A1 | 3/2007 | Miller et al. |
| 2007/0134541 | A1 | 6/2007 | Arisaka et al. |

FOREIGN PATENT DOCUMENTS

| | | | |
|---|---|---|---|
| CN | 201038239 | 3/2008 | |
| JP | 03015159 A * | 1/1991 | ............. H01M 8/02 |
| JP | 2004-342342 | 12/2004 | |
| JP | 2005093391 A * | 4/2005 | ............. H01M 8/02 |
| JP | 2006054198 A * | 2/2006 | ............. H01M 8/02 |
| JP | 2007311094 A | 11/2007 | |
| WO | WO 98/47197 | 10/1998 | |
| WO | WO 2009042665 | 4/2009 | |

OTHER PUBLICATIONS

China Patent Office, Office Action, Patent Application Serial No. 201010003186.8, Mar. 11, 2013, China.

Flexible Graphite-Resin Composite Bipolar Plates for High Energy Density PEM Fuel Cells, Adrianowycz et al., 2008, p. 1-34, Retrieved online on Mar. 26, 2013 from: http://www.fuelcellseminar.com/assets/pdf/2008/wednedsayPM/04_Adrianowycz_O_GHT34-3.ppt.pdf.

* cited by examiner

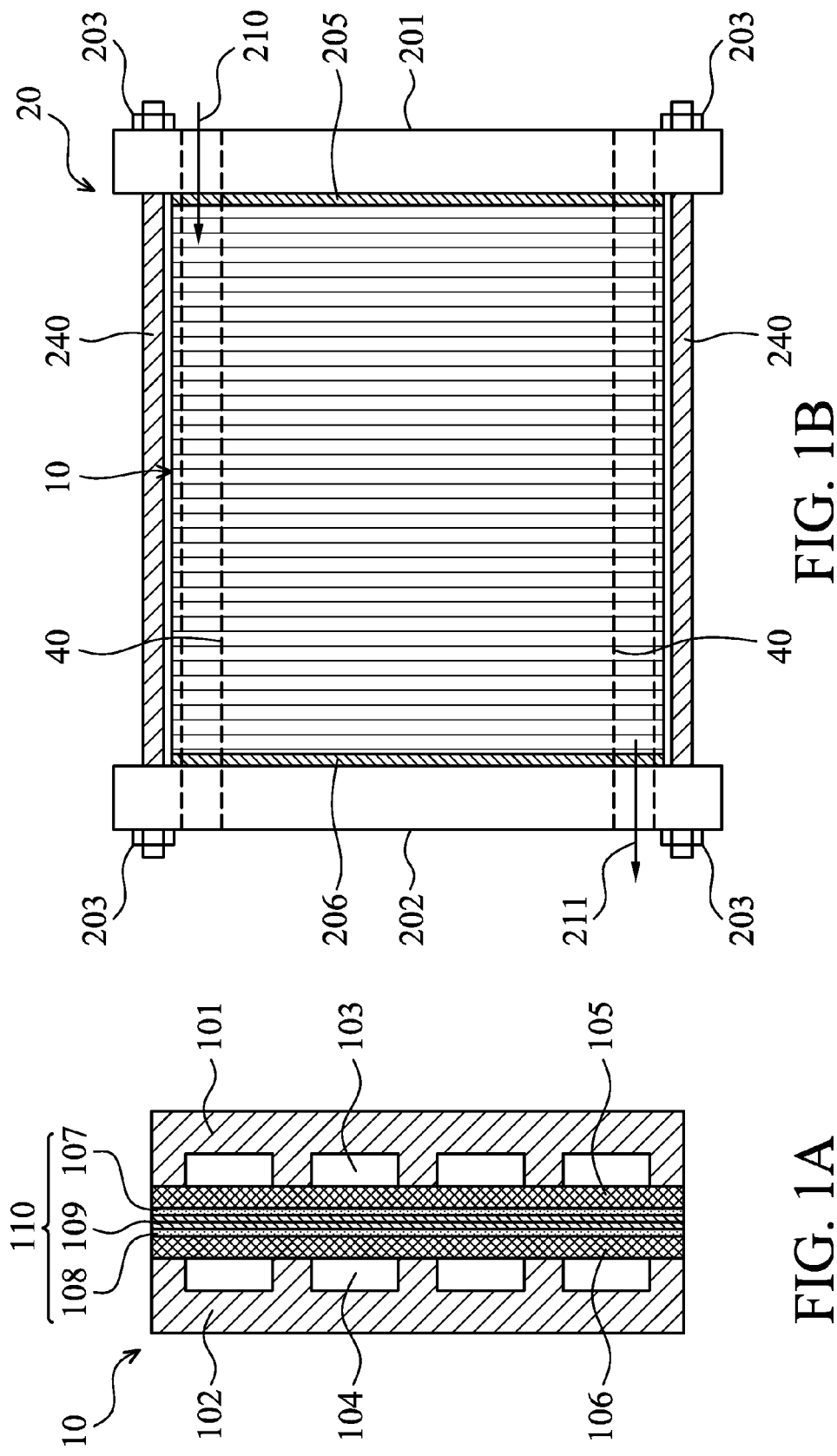

METHOD FOR FORMING FUEL CELL FLUID FLOW FIELD PLATE

CROSS REFERENCE TO RELATED APPLICATIONS

This application is a Divisional of pending U.S. patent application Ser. No. 12/764,858, filed on Apr. 21, 2010 and entitled "Fuel cell fluid flow field plate and method for forming the same", which claims priority of Taiwan Patent Application No. 098144679, filed on Dec. 24, 2009, the entirety of which is incorporated by reference herein.

TECHNICAL FIELD

The technical field relates to a method for manufacturing a fuel cell, and in particular relates to a method for manufacturing a fuel cell fluid flow field plate.

BACKGROUND

Due to the gradual depletion of conventional fossil fuels and the environmental impact caused by using fossil fuels, the development of alternative energy sources with low pollution and high electrical efficiency is becoming more and more important.

Among the many kinds of new energy sources being developed, such as solar cells, bioenergy, or fuel cells, fuel cells have attracted much attention due to their high electrical efficiency (about 55%) and low pollution emissions. In contrast to thermal electric power which uses fossil fuel and which also requires multiple energy transformation steps, the chemical energy of fuel cells can be converted directly into electrical energy. Further, the by-product of the fuel cell is essentially water which does not harm the environment.

In the application of a fuel cell, it is necessary to introduce reaction fluid into a fuel cell, such as a fuel or an oxidant. Therefore, the introduction of the reaction fluid may affect the reliability and performance of a fuel cell. Typically, fluid flow field plates disposed on opposite sides of a membrane electrode assembly are adopted to introduce the reaction fluid. However, for a conventional fuel cell fluid flow field plate, flow channels of the fluid flow field plate may be obstructed or damaged due to an external force, which decreases stability and reliability of the fuel cell.

Thus, in order to solve or reduce the problems mentioned above, a novel fluid flow field plate is desired to obtain a stable and reliable fuel cell.

SUMMARY

One embodiment of the disclosure provides a method for forming a fuel cell fluid flow field plate, including providing a flexible substrate, forming at least one flow channel in a fluid distribution zone of the flexible substrate, forming a manifold in the flexible substrate, wherein the manifold penetrates through the flexible substrate and is next to the fluid distribution zone, bending a portion of the flexible substrate to form an upward extending portion and a cover extending portion, wherein the cover extending portion links with the upward extending portion and covers a portion of the fluid distribution zone, and the upward extending portion extends upward at a position near an interface between the manifold and the fluid distribution zone, and forming at least one through-hole in the upward extending portion, wherein the through-hole penetrates through the flexible substrate and exposes the manifold.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1A is a cross-sectional view of a fuel cell known by the inventor;

FIG. 1B is a cross-sectional view of a fuel cell stack known by the inventor;

DETAILED DESCRIPTION

Figure 1C:
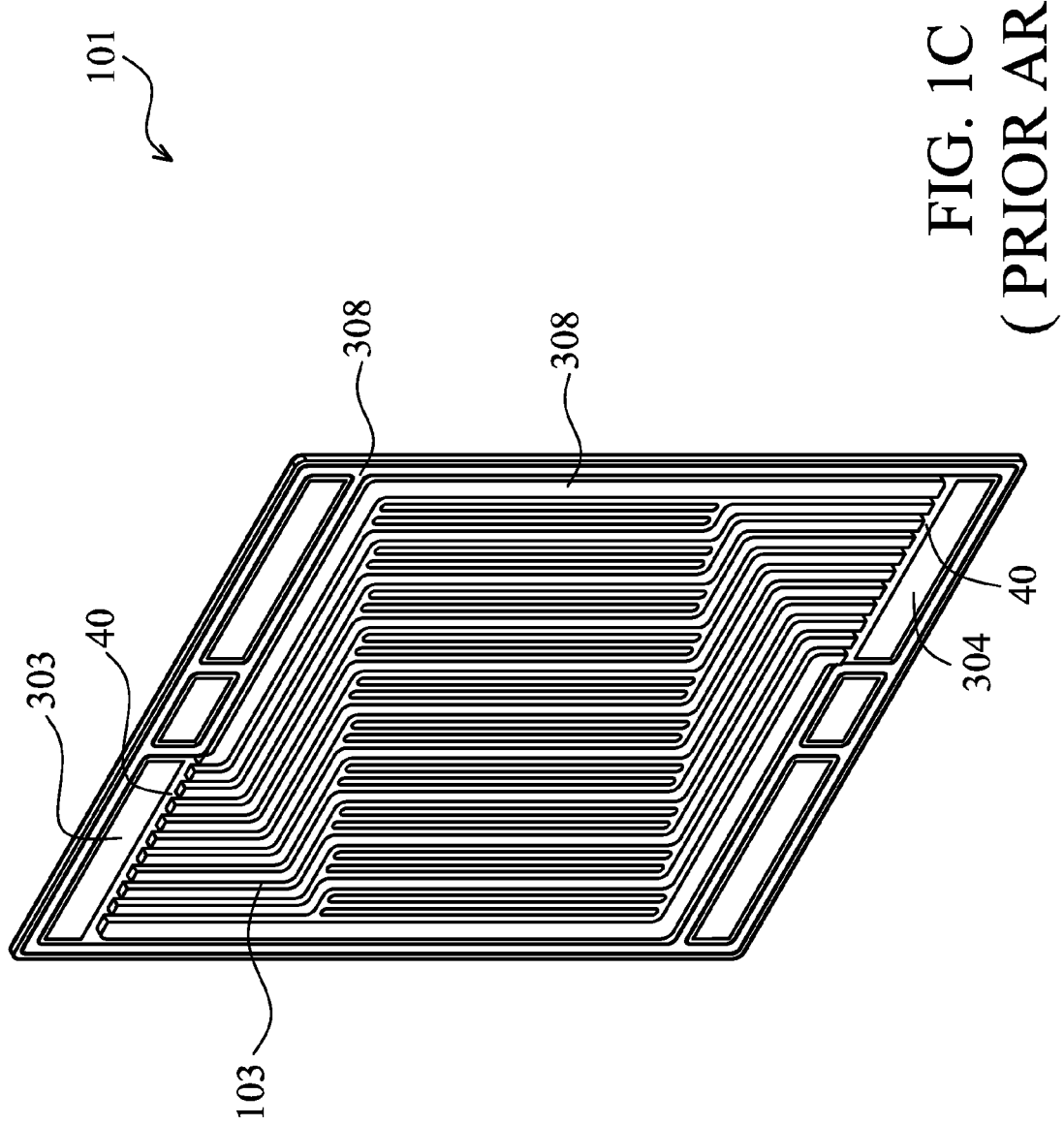
FIG. 1C is a top view of the fuel cell fluid flow field plate known by the inventor.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It is understood, that the following disclosure provides many different embodiments, or examples, for implementing different features of the invention. Specific examples of components and arrangements are described below to simplify the present disclosure. These are, of course, merely examples and are not intended to be limiting.

Before an embodiment of the present invention is illustrated, a structure of a fuel cell and its fluid flow field plate known by the inventor is first described with references made to FIGS. 1A-1C. FIG. 1A shows a cross-sectional view of a single fuel cell 10 which may be a proton exchange membrane (PEM) fuel cell which is also known as a polymer membrane fuel cell. The fuel cell 10 includes a membrane electrode assembly 110 which includes catalytic electrodes 107 and 108 disposed between a proton exchange membrane 109. The catalytic electrodes 107 and 108 may serve as an anode and a cathode of the fuel cell 10, respectively. For example, the catalytic electrode 107 may be a platinum-ruthenium electrode, and the catalytic electrode 108 may be a platinum electrode. The fuel cell 10 further includes gas diffusion layers 105 and 106 disposed between the catalytic electrodes 107 and 108, respectively. The gas diffusion layers 105 and 106 are used to aid in gas diffusion to the catalytic electrodes for reaction. For example, a fuel, such as hydrogen, may diffuse to the catalytic electrode 107 (anode) through the gas diffusion layer 105 while an oxidant, such as air or oxygen, may diffuse to the catalytic electrode 108 (cathode) through the gas diffusion layer 106. In order to provide the desired gas and ensure that the gas is distributed evenly, fluid flow field plates 101 and 102 are disposed on the outer sides of the gas diffusion layers 105 and 106, respectively.

In order to obtain a desired voltage, a plurality of fuel cells 10 may be stacked as a fuel cell stack according to the situation. For example, FIG. 1B shows a fuel cell stack 20. A plurality of fuel cells 10 are stacked together and electrically connected to each other in series. The fuel cells are fixed by fix elements 203 and 240 and plates 201 and 202. Current collectors 205 and 206 are disposed between two ends of the fuel cells 10 to collect the current. After a reaction fluid 210 enters the fuel cell stack 20, the reaction fluid 210 may enter each of the fuel cells 10 through passways 40 of the fluid flow field plate for reaction. The reacted fluid 211 may flow out through another passway 40.

Usually, structures of the fluid flow field plates 101 and 102 are the same or similar. FIG. 1C shows a top view of the fluid flow field plate 101, wherein a reaction surface of the fluid flow field plate 101 facing the membrane electrode assembly 110 is shown. As shown in FIG. 1C, the fluid flow field plate 101 includes an entrance manifold 303 serving as an entrance of the reaction fluid 210 and an exit manifold 304 serving as an exit of the reacted fluid 211. The fluid may flow in or out through the passways 40 linking with the manifolds. The passway 40 further links with a plurality of flow channels 103. These channels 103 help the fluid to be distributed evenly on the reaction surface of the fluid flow field plate 101. A seal ring 308 is disposed on the fluid flow field plate 101 and surrounding the manifolds 302 and 304 and the flow channels 103.

For a fuel cell, it is important to lead the fluid from the entrance manifold 303 to each of the flow channels 103 and lead the reacted fluid to the exit manifold 304. In addition, hermeticity of a fuel cell is another important factor. If the fuel cell is not hermetically sealed, leakage or crossover of the fluid in the cathode side and the anode side may occur which will seriously damage the fuel cell.

However, the position of the fuel cell between the flow channels 103 and the passway 40 of the manifold makes it difficult to support or seal. The assembly stress of the fuel cell stack 20 may propagate to each element of the fuel cell stack 20. Because there is no support near the sides of the entrance manifold 303 and the exit manifold 304, the membrane electrode assembly 110 may be easily separated from the gas diffusion layers 105 and 106 due to assembly stress, such that the fuel cell stack can not be sealed well. Crossover of the reaction fluid may occur. In addition, the membrane electrode assembly 110 and the gas diffusion layers 105 and 106 may collapse into the entrance or exit of the flow channel 103 such that the flow of the fluid is not smooth or it becomes blocked. In addition, when the fuel cells are stacked and packaged, edges of the entrance of the flow channel and the manifold 303 (or 304) may be bent easily such that the fuel cell can not be sealed well and crossover of the reaction gas may occur.

Thus, in order to prevent the problems mentioned above, a novel fluid flow field plate according to an embodiment of the present invention is provided, wherein a special design is adopted between the flow channels and the manifolds. The stress caused by the stacking of the fuel cell may be resisted which significantly improves the stability and the reliability of the fuel cell.

Figure 2:
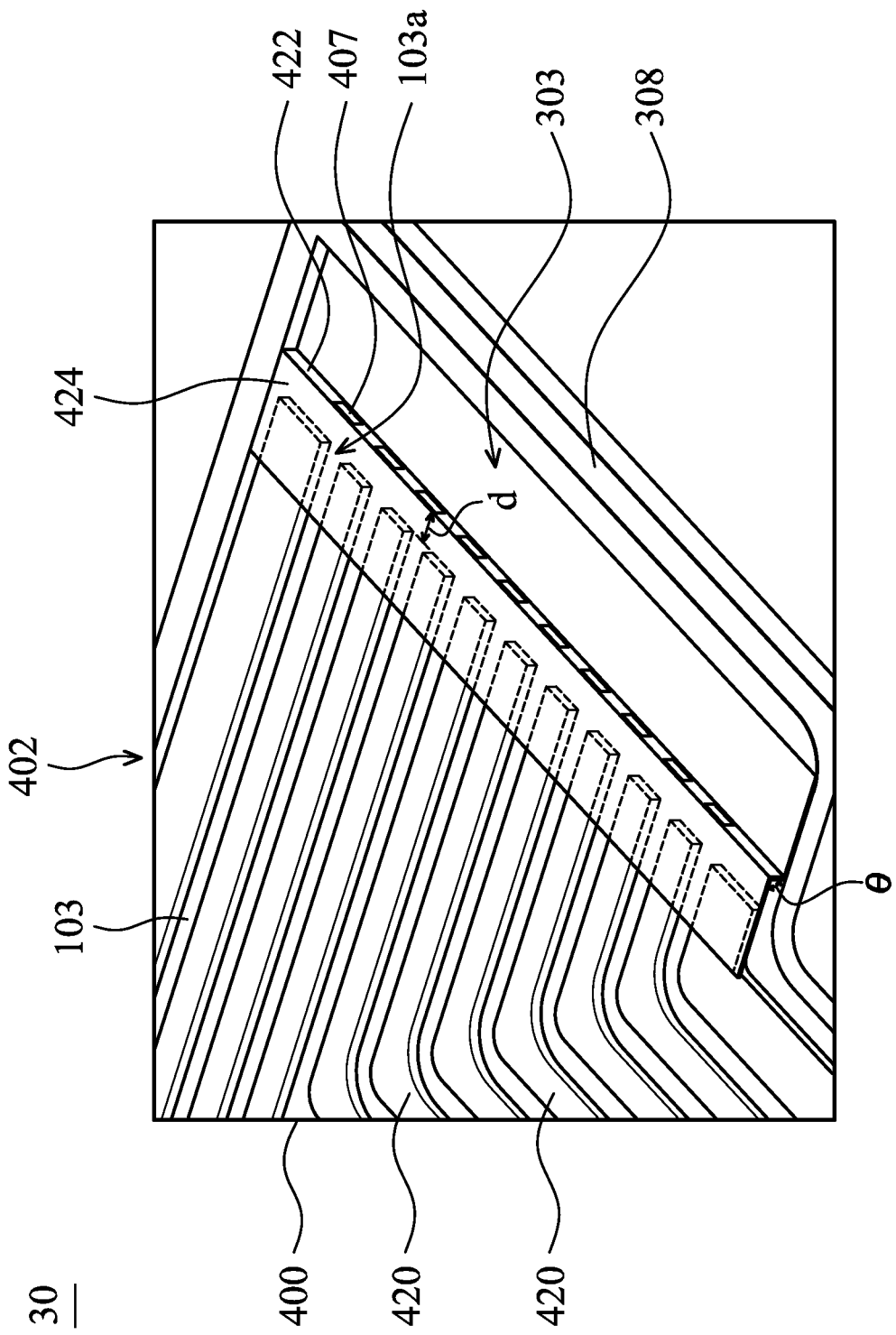
FIG. 2 is a three-dimensional view showing a fuel cell fluid flow field plate according to an embodiment of the present invention.

FIG. 2 shows a three-dimensional view of a fuel cell fluid flow field plate 30 according to an embodiment of the present invention, wherein similar or same reference numbers are used to designate similar or same elements. In one embodiment, the flow field plate 30 includes a flexible substrate 400 which may be, but not limited to, a flexible metal plate or a flexible polymer plate. For example, the flexible substrate 400 may include a thin metal plate with ductility and flexibility. The material of the flexible substrate 400 may include a copper, aluminum, gold, alloy thereof, or combinations thereof. In addition, the flexible substrate 400 may be a single-layered flexible substrate. In another embodiment, the flexible substrate 400 may comprise a stacked structure including a plurality of flexible substrates.

The flexible substrate 400 includes a fluid distribution zone 402 and a nearby manifold 303. The manifold 303 penetrates through the flexible substrate 400 and serves as a passway for the reaction fluid to flow in or out from the fuel cell. The fluid distribution zone includes at least one flow channel 103 which is used to evenly redistribute the reaction fluid on the membrane of the electrode assembly. In the embodiment shown in FIG. 2, the fluid distribution zone 402 has a plurality of flow channels 103. These flow channels 103 are respectively located at a plurality of recess portions between a plurality of protruding portions in the fluid distribution zone 402. That is, sidewalls of the protruding portions are channel sidewalls of the flow channels 103. It should be appreciated that the shape and disposition of the flow channels 103 shown in FIG. 2 are merely specific examples for illustration. Thus, embodiments of the invention are not limited thereto. Embodiments of the invention may be modified or tuned according to the situation and requirement. In addition, the flow channels 103 of an embodiment of the invention are suitable for a gaseous fluid or a liquid fluid. Thus, embodiments of the invention are also adapted for use in a direct oxidation fuel cell, such as a direct methanol fuel cell.

As shown in FIG. 2, the flexible substrate 400 further includes an upward extending portion 422. The upward extending portion 422 extends upward at a position near an interface between the manifold and the fluid distribution zone. There is a bend angle θ between the upward extending portion 422 and the fluid distribution zone 402. In one embodiment, the bend angle θ between the upward extending portion 422 and the fluid distribution zone 402 is about 90 degree. However, embodiments of the invention are not limited thereto. In another embodiment, the bend angle θ may be, for example, about 30 degree, 45 degree, 60 degree, or 75 degree. In yet another embodiment, the bend angle θ may be larger than 90 degree.

As shown in FIG. 2, the flexible substrate 400 further includes a cover extending portion 424 which links with the upward extending portion 422 and covers a portion of the fluid distribution zone 402. In this embodiment, the cover extending portion 424 cover a portion of the flow channels 103. The open ends 103a of the flow channels 103 are protected by the cover extending portion 424 covering thereon. Thus, the open ends 103a of the flow channels 103 may not be deformed by a stress, ensuring a smooth flow of the reaction fluid. In one embodiment, the cover extending portion 424 directly contacts with the protruding portions 420 beside the flow channels 103.

As shown in FIG. 2, the upward extending portion 422 has at least one through-hole 407 which penetrates through the flexible substrate 400 to expose the manifold 303. That is, the through-hole 407 penetrating through the upward extending portion 422 links the manifold 303 on one side of the upward extending portion 422 to the open ends 103a of the flow channels 103 on the other side of the upward extending portion 422. Thus, the reaction fluid may flow through the manifold 303, the through-hole 407, and the open ends 103a of the flow channels 103 to the fluid distribution zone to join the electrochemical reaction. Similarly, the reacted fluid may also be led out through these passways.

Figure 3:
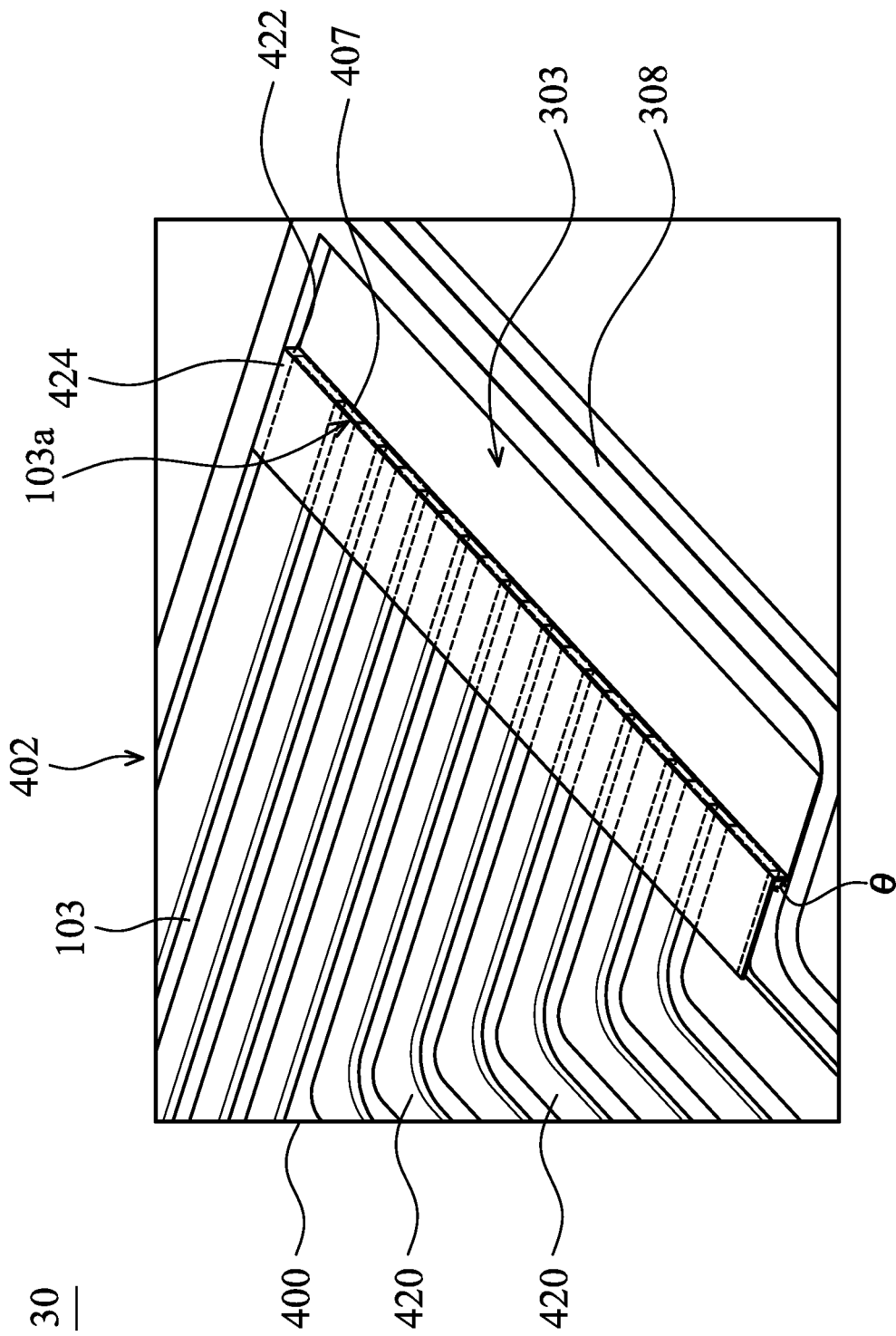
FIG. 3 is a three-dimensional view showing a fuel cell fluid flow field plate according to an embodiment of the present invention.
Figure 4:
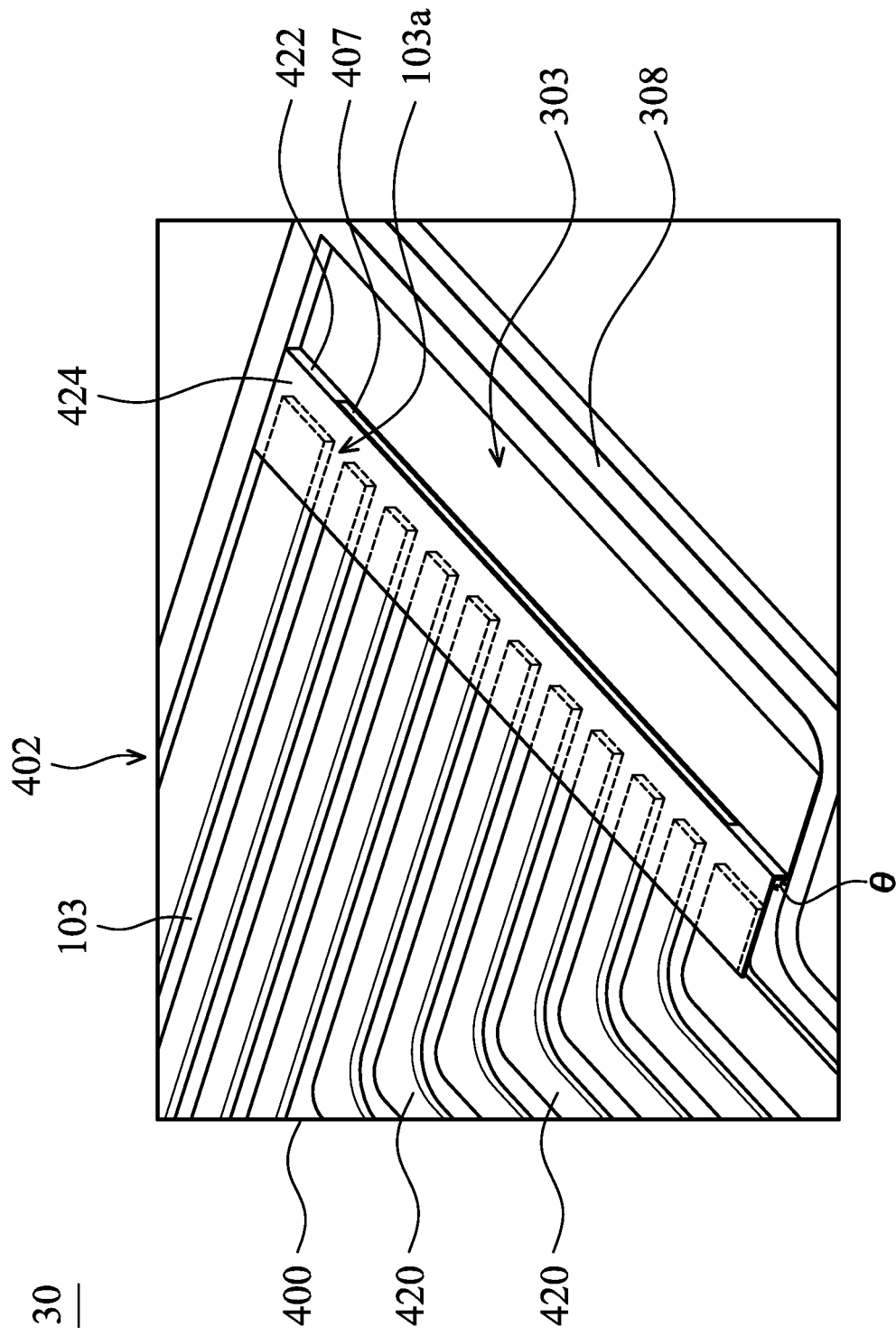
FIG. 4 is a three-dimensional view showing a fuel cell fluid flow field plate according to an embodiment of the present invention.

In the embodiment shown in FIG. 2, the upward extending portion 422 has a plurality of through-holes 407. The open ends 103a of the flow channels 103 are separated from the open ends of the through-holes 407 by a distance d, respectively. In addition, each open end 103a of the flow channels 103 may optionally be aligned with one of the through-holes 407. However, embodiments of the invention are not limited thereto. In another embodiment, the open ends 103a of the flow channels 103 may be in direct contact with the open ends of the through-holes 407, and thus there is no distance therebetween. In this situation, the upward extending portion 422 may be in direct contact with the protruding portions near the open ends 103a of the flow channels 103. FIG. 3 shows a three-dimensional view of a fuel cell fluid flow field plate 30 according to an embodiment of the present invention, wherein the open ends 103a of the flow channels 103 and the open ends of the through-holes 407 are aligned and sealed with each other. In addition, the through-hole 407 is not limited to plural sets as those shown in FIG. 2. For example, in the embodiment shown in FIG. 4, there is only a single through-hole 407 formed in the upward extending portion 422. Further, shapes of the open end of the through-hole 407 may vary according to the situation. For example, the shape of the open end of the through-hole 407 may be a square, rectangle, circle, ellipse, or other suitable shape.

As shown in FIG. 2, the fluid flow field plate 30 may further include a seal ring 308 which is disposed overlying the flexible substrate 400 and surrounds the fluid distribution zone 402 and the manifold 303. The seal ring 308 serves as a seal element between the fluid flow field plate 30 and the membrane electrode assembly or the gas diffusion layer. In one embodiment, the seal ring 308 is disposed on a trench (not shown) surrounding the fluid distribution zone 402 and the manifold 303. In one embodiment, the upper surface of the seal ring 308 is substantially coplanar with the upper surface of the cover extending portion 424.

The upward extending portion 422, the cover extending portion 424, and the through-hole 407 together form a thin shell passway structure between the entrance (or exit) manifold and the flow channels. In this embodiment, the upward extending portion 422 and the cover extending portion 424 of the thin shell passway structure provide a stable protection and support to the passway which is between the manifold and the flow channels. Damages of the fluid flow field plate 30 or separations of the elements, such as the membrane electrode assembly, the gas diffusion layer, and the fluid flow field plate, of the fuel cell stack caused by the stress generated when the fuel cells are stacked may be prevented, which significantly improves stability and reliability of the fuel cell stack.

In one embodiment, the upward extending portion 422 and the cover extending portion 424 are formed by bending a portion of the flexible substrate 400. In this situation, each of the upward extending portion 422, the cover extending portion 424, and the fluid distribution zone 402 is a portion of the flexible substrate 400. Thus, in one embodiment, materials of the upward extending portion 422, the cover extending portion 424, and the fluid distribution zone 402 are the same. The manufacturing processes of the thin shell passway structure which is formed by bending a portion of the flexible substrate 400 and includes the upward extending portion 422, the cover extending portion 424, and the fluid distribution zone 402 are illustrated with references made to FIGS. 5A-5C. However, it should be appreciated that the following description is merely a specific example of a method for forming a fuel cell fluid flow field plate according to an embodiment of the invention. Embodiments of the invention are not limited to be formed by the specific method.

Figure 5A:
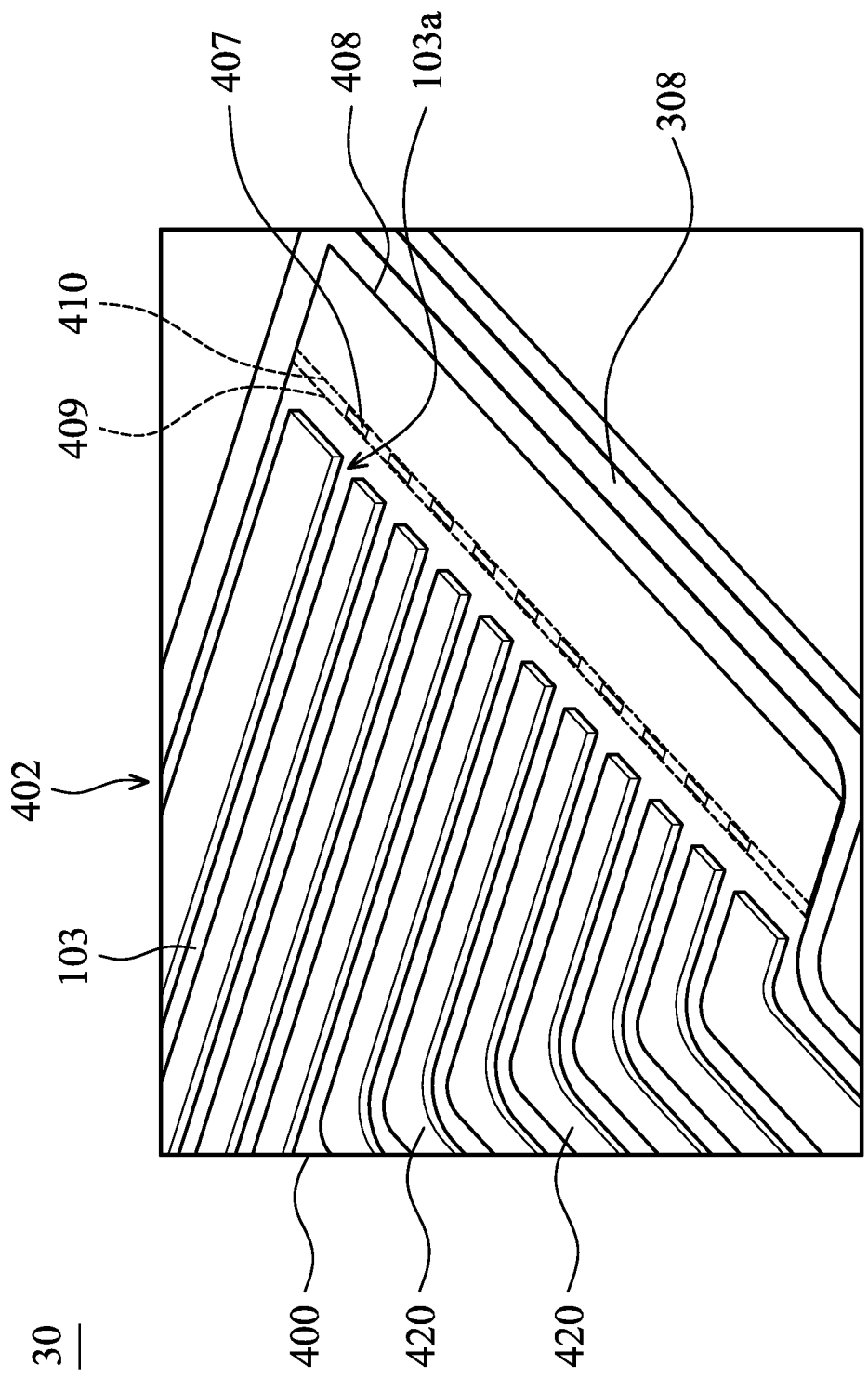
FIGS. 5A-5C are three-dimensional views showing the steps in forming a fuel cell fluid flow field plate according to an embodiment of the present invention.
Figure 5B:
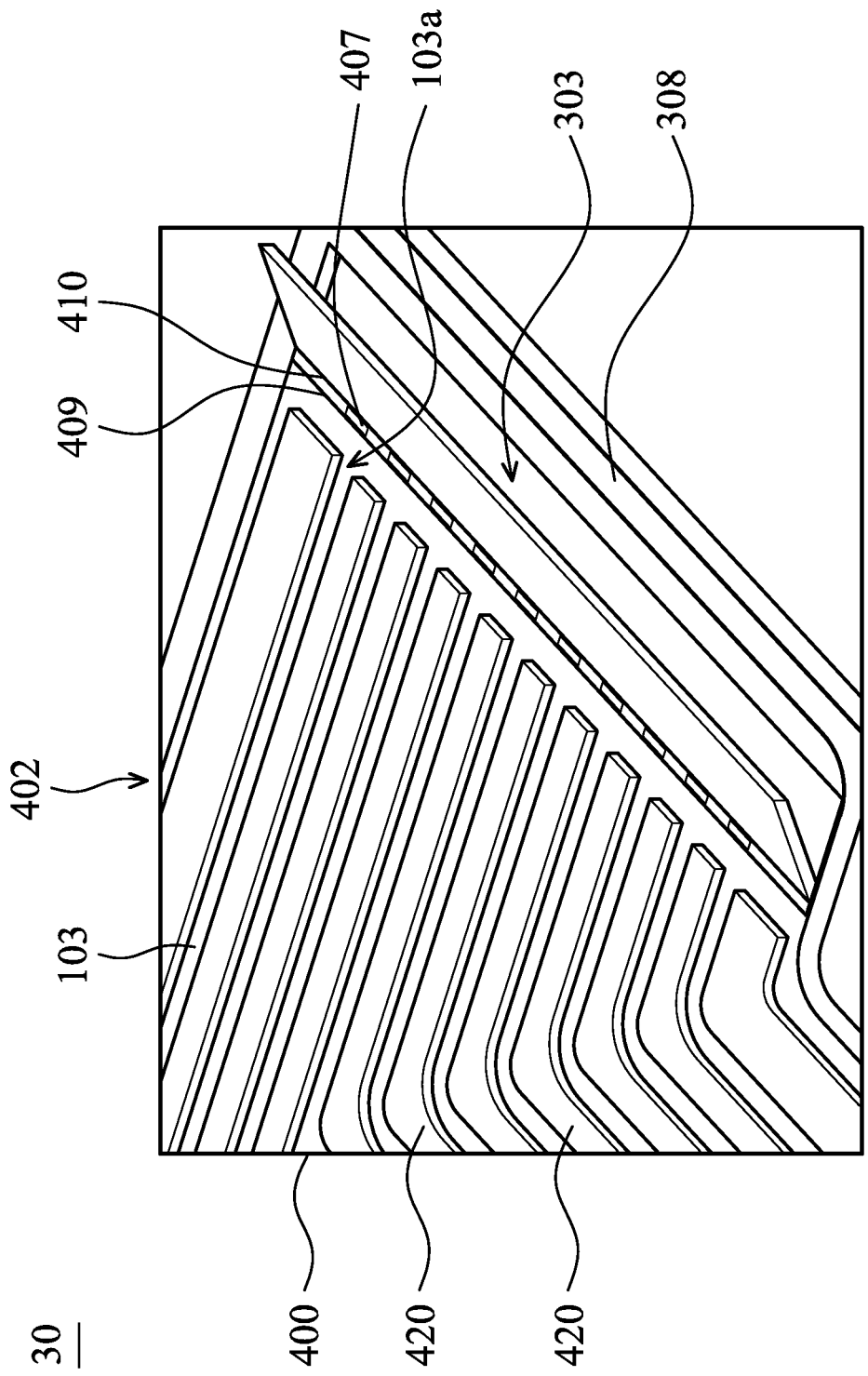
Figure 5C:
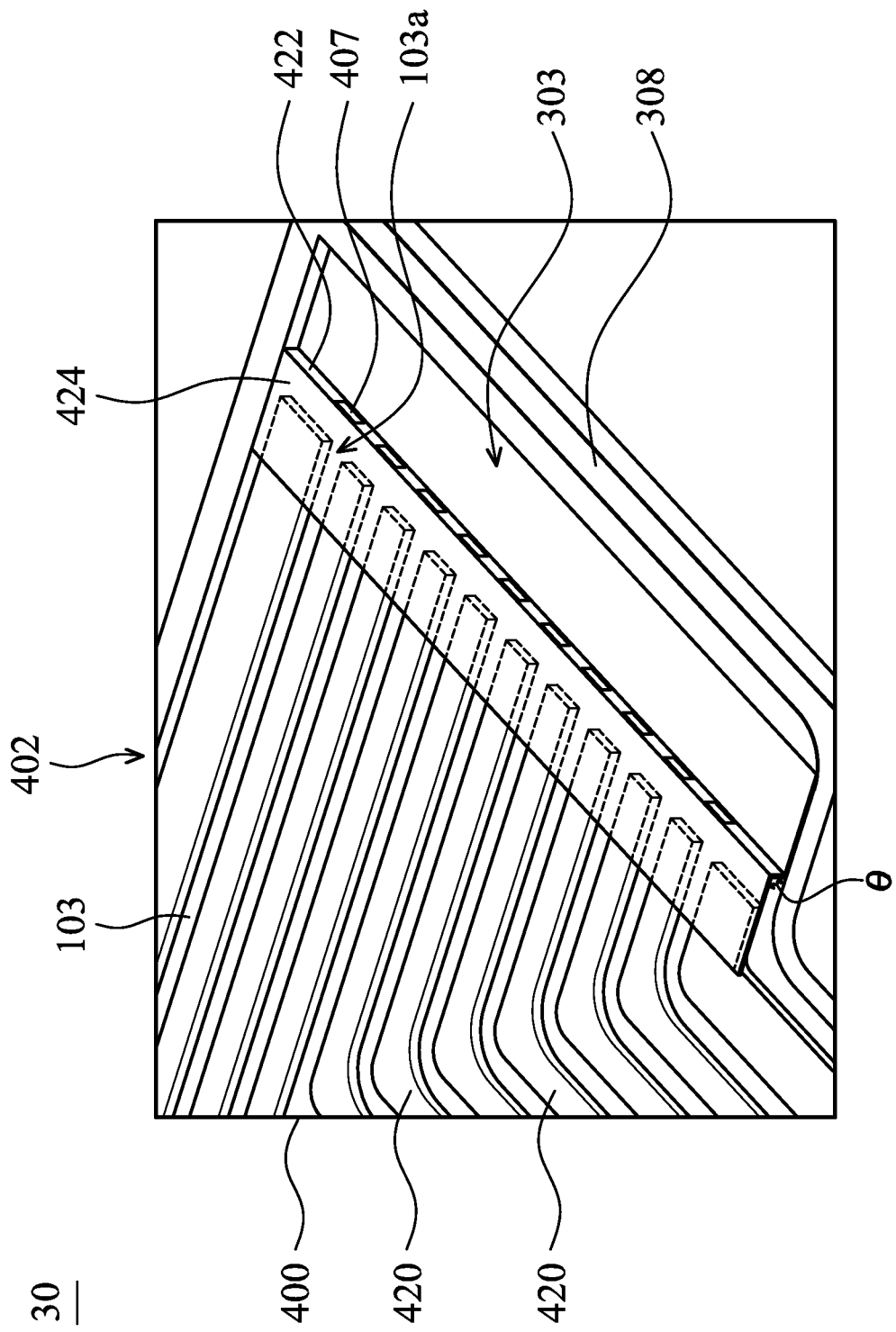

FIGS. 5A-5C are three-dimensional views showing the steps in forming a fuel cell fluid flow filed plate according to an embodiment of the present invention, wherein similar or same reference numbers are used to designate similar or same elements.

As shown in FIG. 5A, a flexible substrate 400 is provided. Then, at least one flow channel 103 is formed in a fluid distribution zone 402 of the flexible substrate 400, and a manifold 303 is formed in the flexible substrate 400 (see FIG. 5B). The manifold 303 penetrates through the flexible substrate 400 and is next to the fluid distribution zone 402. In one embodiment, a gap (or a cutting line) 408 penetrating through the flexible substrate 400 may be formed along a portion of the edge of the predetermined area where the manifold 303 is to be formed.

Then, as shown in FIG. 5B, a portion of the flexible substrate 400 is bent to form an upward extending portion 422 and a cover extending portion 424 (see FIG. 5C). The cover extending portion 424 links with the upward extending portion 422 and covers a portion of the fluid distribution zone 402. Wherein, the upward extending portion 422 extends upward at a position near the interface between the manifold 303 and the fluid distribution zone 402. There is a bend angle θ between the upward extending portion 422 and the fluid distribution zone 402. The bent portion is surrounded by the gap 408 and a predetermined bending line. For example, the predetermined bending line may include two bending lines 410 and 409 which are parallel to each other. In FIG. 5A, the flexible substrate 400 between the bending lines 410 and 409 will become the upward extending portion 422 after the bending step which is the process shown in figures FIG. 5B to FIG. 5C. In FIG. 5A, the flexible substrate 400 surrounded by the bending line 410 and the gap (or cutting line) 408 will become the cover extending portion 424 after the bending step.

In one embodiment, after the flexible substrate 400 surrounded by the bending line 410 and the gap (or cutting line) 408 is bent, an opening which penetrates through the flexible substrate 400 will be formed (or left), wherein the opening is used as the manifold 303. In this case, the formation of the manifold 303 includes forming a gap (or a cutting line) 408 penetrating through the flexible substrate 400 along a portion of the edge of the predetermined area where the manifold 303 is to be formed, and bending the flexible substrate 400 surrounded by the gap 408 and the predetermined bending line 410 around the bending line 410. The opening left in the flexible substrate 400 is thus now the manifold 303.

Then, the flexible substrate 400 is bent again in a direction toward the fluid distribution zone 402 and around the bending line 409 which is substantially parallel to the bending line 410, and therefore the upward extending portion 422 and the cover extending portion 424 are formed.

In addition, at least one through-hole 407 may be formed in the upward extending portion 422, which penetrates through the flexible substrate 400 and exposes the manifold 303. In one embodiment, the formation of the through-hole 407 is performed before the bending step in which a portion of the flexible substrate 400 is bent to form the upward extending portion 422 and the cover extending portion 424. At least one through-hole 407 may first be formed in the flexible substrate 400 between the predetermined bending lines 409 and 410. By designing the disposition of the preformed through-hole 407, the through-hole 407 may align with a predetermined position after the bending of the flexible substrate 400. In addition, in order to bend the flexible substrate 400 smoothly, bendable marks may be optionally formed at the positions of the predetermined bending lines 409 and 410. The bendable marks may include, for example, a plurality of dot recesses or a trench. In addition, a seal ring surrounding the fluid distribution zone 402 and the manifold 303 may be formed overlying the flexible substrate 400. For example, a trench on which the seal ring is to be disposed may first be formed in the flexible substrate 400.

The elements or structures mentioned above may be obtained by using a deposition, coating, etching, or dicing process. However, in an embodiment, it is preferable to use a preformed mold to form the needed elements in a single process such that manufacturing time and cost are significantly reduced.

Figure 6:
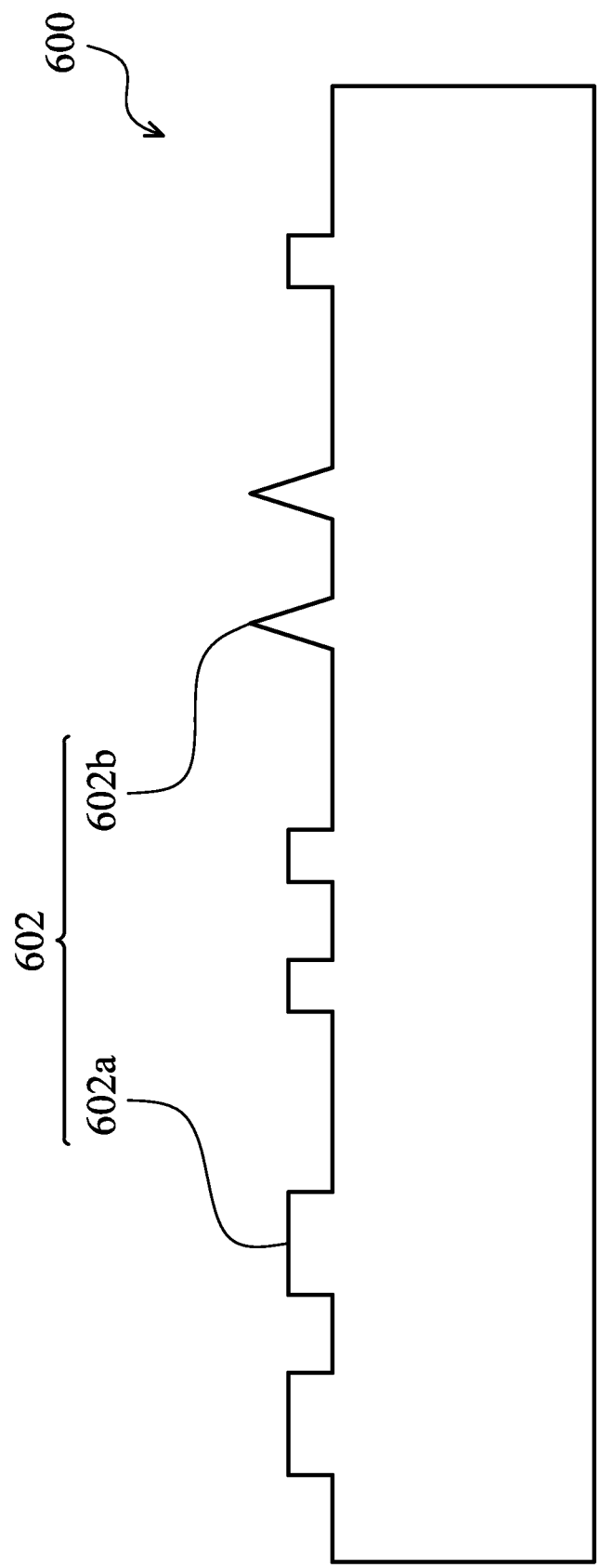
FIG. 6 is a cross-sectional view of a mold used in a method for forming a fuel cell fluid flow field plate according to an embodiment of the present invention.

For example, the flexible substrate 400 may be pressed on mold 600 having a plurality of protruding portions 602, as shown in FIG. 6. After the pressing step, a portion of the protruding portions 602a may make the flexible substrate 400 correspond to the protruding portions 602a to deform, and thus the protruding structures or recess structures are formed in the flexible substrate 400, such as the protruding structures beside the flow channel 103 or the recess structures used as the bendable marks or the trenches below the seal ring. In addition, the mold may include sharper protruding portions 602b which may penetrate through the flexible substrate 400 to form the desired through-holes, such as the through-hole 407 or the gap 408. In this case, the flow channels 103, the manifold 303, the through-hole 407, the bendable marks, and the recess structure below the seal ring are formed simultaneously. It should be appreciated that the mold 600 shown in FIG. 6 is merely an illustrative example, wherein the relative locations of the protruding portion 602a and the sharper protruding portions 602b of the protruding portion 602 do not correspond to the previously described embodiment. One skilled in the art may tune the position, distribution, and shape of the protruding portions 602 according to the requirement. After the pressing step, a desired flexible substrate is thus formed.

The fuel cell fluid flow filed plate in accordance with an embodiment of the present invention is formed by a fast and cheap process. The formed thin shell passway structure can effectively protect the passway in the fluid flow filed plate, which significantly improves the stability and the reliability of the fuel cell. By bending the flexible substrate to form the thin shell passway structure, the manufacturing process is fast, and the alignment between the passways in the fluid flow field plate is automatically and precisely achieved. Because the thin shell passway structure is formed by bending the body of the fluid flow field plate, the design of the original flow channels is not affected. Thus, there is no concern about assembly, packaging, or alignment. The manufacturing process may be performed in an automated process. The problem regarding the fluid where it cannot flow smoothly between the flow channels and the manifold or the sealing problem may be overcame or reduced by using the fuel cell fluid flow filed plate according to an embodiment of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for forming a fuel cell fluid flow field plate, comprising:
    providing a flexible substrate;
    forming at least one flow channel in a fluid distribution zone of the flexible substrate;
    forming a manifold in the flexible substrate, wherein the manifold penetrates through the flexible substrate and is next to the fluid distribution zone;
    bending a portion of the flexible substrate to form an upward extending portion and a cover extending portion, wherein the cover extending portion links with the upward extending portion and covers a portion of the fluid distribution zone, and the upward extending portion extends upward at a position near an interface between the manifold and the fluid distribution zone; and
    forming at least one through-hole in the upward extending portion, wherein the through-hole penetrates through the flexible substrate and exposes the manifold.

2. The method for forming a fuel cell fluid flow field plate as claimed in claim 1, further comprising forming a gap penetrating through the flexible substrate before the bending step of the flexible substrate, wherein the gap and a first predetermined bending line on the flexible substrate surround the portion of the flexible substrate to be bent.

3. The method for forming a fuel cell fluid flow field plate as claimed in claim 2, wherein the step of bending a portion of the flexible substrate to form the upward extending portion and the cover extending portion, comprises:
    upward bending a portion of the flexible substrate to be bent around the first predetermined bending line; and
    bending the flexible substrate around a second predetermined bending line on the flexible substrate such that a portion of the flexible substrate to be bent is bent in a direction toward the fluid distribution zone, wherein the second predetermined bending line substantially parallels with the first predetermined bending line.

4. The method for forming a fuel cell fluid flow field plate as claimed in claim 3, further comprising forming at least one recess on the first predetermined bending line and the second predetermined bending line.

5. The method for forming a fuel cell fluid flow field plate as claimed in claim 3, further comprising forming at least one hole penetrating the flexible substrate between the first predetermined bending line and the second predetermined bending line before the step of bending a portion of the flexible substrate, wherein the at least one hole becomes the at least one through-hole after the upward extending portion is formed.

6. The method for forming a fuel cell fluid flow field plate as claimed in claim 5, wherein the at least one flow channel, the manifold, and the at least one hole are formed simultaneously.

7. The method for forming a fuel cell fluid flow field plate as claimed in claim 1, wherein the at least one flow channel and the manifold are formed simultaneously.

8. The method for forming a fuel cell fluid flow field plate as claimed in claim 1, further comprising disposing a seal ring on the flexible substrate, wherein the seal ring surrounds the fluid distribution zone and the manifold.

9. The method for forming a fuel cell fluid flow field plate as claimed in claim 1, wherein the flexible substrate comprises a flexible metal plate or a flexible polymer plate.

* * * * *